(12) United States Patent
McInnis

(10) Patent No.: US 6,200,484 B1
(45) Date of Patent: Mar. 13, 2001

(54) SURFACE WATER FILTRATION APPARATUS

(76) Inventor: Stephen J. McInnis, P.O. Box 30087, Portland, OR (US) 97249

(*) Notice: Subject to any disclaimer, the term of this patent is extended or adjusted under 35 U.S.C. 154(b) by 0 days.

(21) Appl. No.: 09/527,064

(22) Filed: Mar. 16, 2000

(51) Int. Cl.[7] .................................. E03F 5/04; C02F 1/28
(52) U.S. Cl. ......................... 210/693; 210/747; 210/908; 210/164; 210/170; 210/483; 404/4
(58) Field of Search ................................. 210/163–165, 210/170, 502, 483, 690–693, 747, 908; 404/4

(56) References Cited

U.S. PATENT DOCUMENTS

| | | |
|---|---|---|
| 3,713,539 | 1/1973 | Thompson et al. . |
| 3,815,748 | 6/1974 | Johannessen . |
| 4,419,232 * | 12/1983 | Arntyr et al. . |
| 4,988,235 | 1/1991 | Hurley . |
| 5,037,541 * | 8/1991 | Ruey-Jang et al. . |
| 5,133,619 | 7/1992 | Murfae et al. . |
| 5,223,154 | 6/1993 | MacPherson, Jr. et al. . |
| 5,284,580 | 2/1994 | Shyh . |
| 5,345,741 | 9/1994 | Slater et al. . |
| 5,372,714 | 12/1994 | Logue, Jr. . |
| 5,397,464 | 3/1995 | Hannon . |
| 5,403,474 | 4/1995 | Emery . |
| 5,405,539 | 4/1995 | Schneider . |
| 5,480,254 | 1/1996 | Autry et al. . |
| 5,486,287 | 1/1996 | Murphy et al. . |
| 5,529,436 | 6/1996 | Meyers . |
| 5,575,925 | 11/1996 | Logue, Jr. . |
| 5,958,226 * | 9/1999 | Fleischmann . |
| 5,985,157 * | 11/1999 | Leckner et al. . |
| 6,080,307 * | 6/2000 | Morris et al. . |
| 6,086,758 * | 7/2000 | Schilling et al. . |
| 6,106,707 * | 8/2000 | Morris et al. . |

FOREIGN PATENT DOCUMENTS

| | | |
|---|---|---|
| 10-338908 * | 12/1998 | (JP) . |
| 11-057693 * | 3/1999 | (JP) . |

* cited by examiner

Primary Examiner—David A. Simmons
Assistant Examiner—Fred Prince
(74) Attorney, Agent, or Firm—Ipsolon LLP

(57) ABSTRACT

A sump tank insert is inserted into preexisting catch basins and is covered with a grate that acts as a primary filter for large debris. A deflector plate is positioned across the inlet to the tank and a filter basket is suspended into the tank from the deflector plate. Surface water flowing through the grate and the secondary filter of the filter basket flows through a tertiary filter comprising fibrous synthetic filter media interposed between the secondary filter basket and the outlet pipe. The filter media of the tertiary filter is selected according to the type of contaminants that are to be removed, and petrochemicals such as oils from cars that is contained in run-off from parking lots and the like.

16 Claims, 2 Drawing Sheets

Fig. 1
*(PRIOR ART)*
Fig. 2
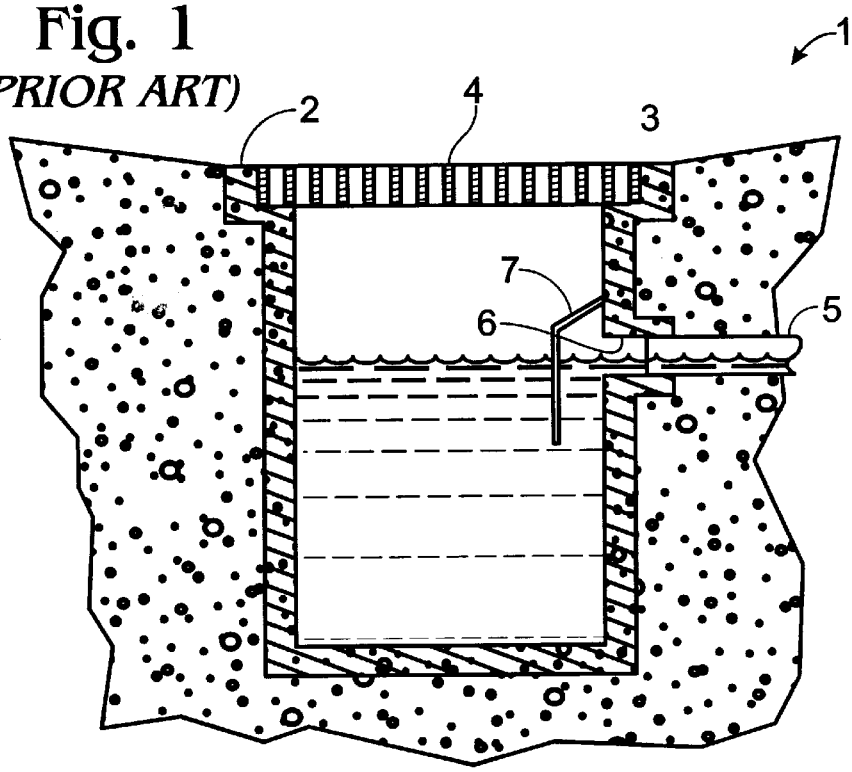
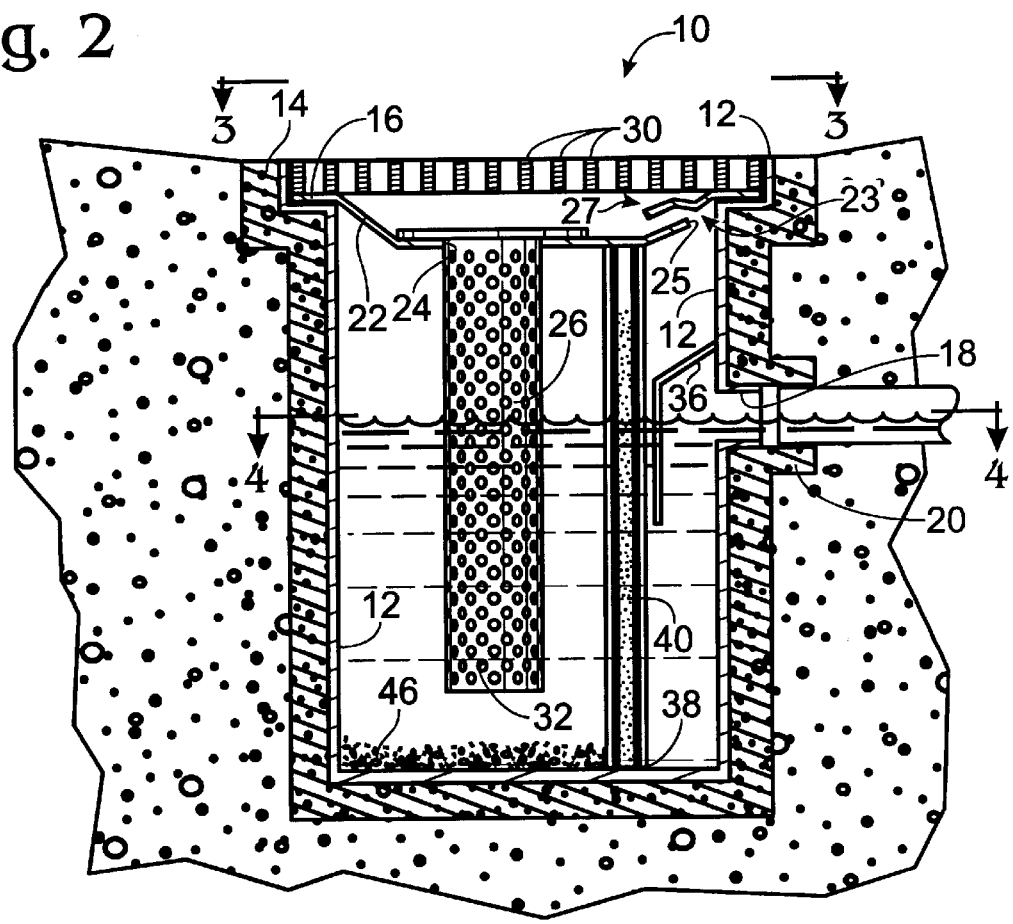

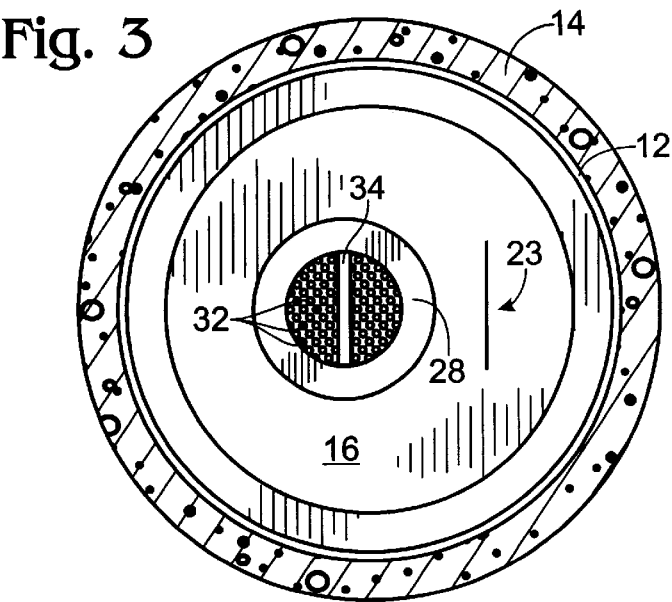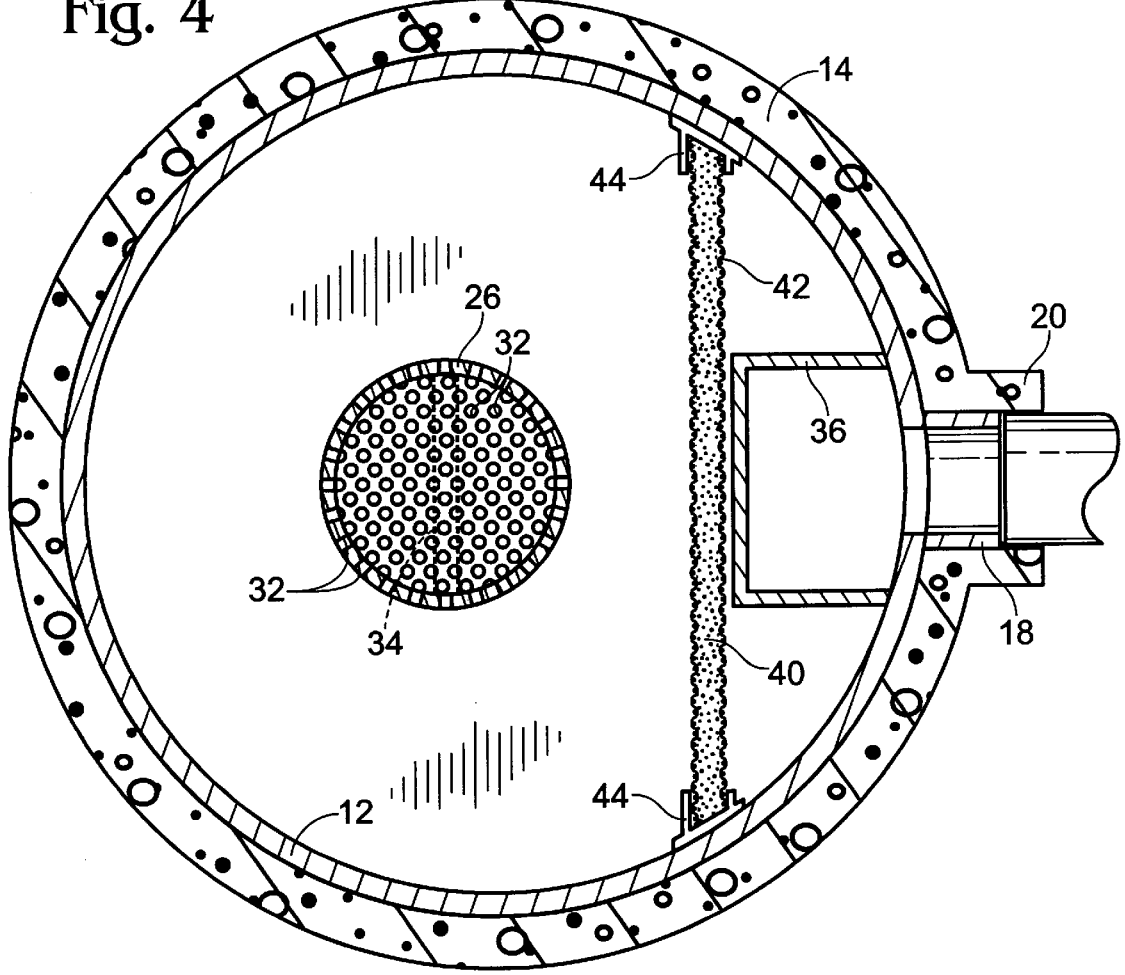

SURFACE WATER FILTRATION APPARATUS

FIELD OF THE INVENTION

This invention relates to a filtration apparatus for surface water, and more specifically, to a three stage filtration apparatus for removing sediment and other contaminants from surface water.

BACKGROUND OF THE INVENTION

Surface water run-off is coming under increased scrutiny as a source of pollutants entering ground water, streams and rivers. As water from rain or snow melt and other sources flows over the surface of the ground it picks up a wide variety of pollutants, ranging from large and small debris, suspended solids and sediment to oils and other soluble and insoluble chemical contaminants. Because surface water is relatively easily contained through storm sewers and dry wells, many agencies at all levels of the government are paying increased attention to both the contaminants that enter the water system through surface water run-off, and to methods to control and eliminate such contaminants. Moreover, governmental regulations currently in place put restrictions on the amount of sediment that can be permitted to flow into sewer systems.

A municipal storm sewer system is one type of traditional surface water filtering system. In this type of system a series of grated catch basins or collection boxes are interconnected with sewer pipe. Surface water flows through the grate, which catches large objects such as branches, rocks and the like. The water that flows through the grate enters the catch basin, which is a collection box or vault that functions essentially a settling basin. Such collection boxes are sometimes called sump tanks. Some sediment that flows through the grate settles to the bottom of the basin, and the water flows through an outlet pipe and into the sewer system and, depending upon the system, either to another processing facility or directly into a stream or river.

This traditional system is useful as a primary control system, and is relatively inexpensive, but it has many problems. As examples of the problems, the catch basin can quickly be filled with sediment if the water contains a high level of solids or sediment, causing the catch basin to become filled and the system to overflow or become clogged. Because the catch basin is typically a cylindrical tube or a rectangular box that sits below grade level, cleaning the sediment out of the basin can be a difficult job. Cleaning is made much more difficult if the system is clogged and the basin is underwater. Just as important, the system does not stop all of the sediment and other pollutants in the run-off. Typically, the water flow through the basin is fairly turbulent, especially when there is a lot of water flowing through the system, for instance during a storm. When this occurs very little sediment settles out, and is instead washed through the basin and into the sewer system. This may result in non-compliance with governmental regulations, possibly resulting in fines. Finally, a typical catch basin system does nothing to collect oils and other chemical contaminants and dissolved solids.

The grated catch basin type of system is routinely used with both private and municipal dry wells. In a dry well the surface water that flows through the sump tanks flows into a dry well associated with one or more basins rather than flowing into a municipal or other sewer system. However, to function properly, dry wells must have sufficient flow-through characteristics. Water containing a high level of sediment can quickly clog a dry well by stopping water flow-through. And as noted above, a grated catch basin does not stop oils and other chemicals. These kinds of pollutants, and especially oils that flow through the system can cause clog dry wells very quickly. Commercial dry wells can be very large, especially if they are used to contain run-off from a large area such as a large private parking lot, and are connected to numerous catch basins. It is typically very expensive to dig a new dry well, or to unclog an existing well.

As noted, many government agencies are paying increased attention to contaminants that are carried into streams and rivers in surface water run-off. Because polluted surface water run-off can be a significant source of pollution, agencies have begun to monitor the levels of contaminants in run-off, both in municipal and private systems. In the past several years, many municipalities have begun to impose fees on catch basin users, whether the catch basin is connected to a storm sewer system or a dry well. While these fees apply in most instances to commercial users, they can also apply to residential systems. In large part the fees are based in some manner on the kind and amount of pollutants that flow through the catch basin and into the system. In general, the higher the level of contaminants flowing through the system, the higher the fee. In some cases the amount of the fee is based on the kind of contaminant. For example, oils flowing into a sewer or dry well can lead to increased fees. These fees even apply to private commercial dry well users, since it is in the interest of a municipality to control the amount of pollution that enters the ground water.

There is therefore a strong incentive to decreasing both the amount and kind of contaminants flowing through a catch basin and into either a municipal sewer system or a private dry well or sewer system. First, there is an obvious environmental incentive: by decreasing contamination of all kinds from surface water run-off, the water that flows back into the ground and into streams and rivers is cleaner. This helps to improve environmental conditions in numerous ways. Second, there is a strong economic incentive: when sewer system and dry well users are paying fees based on the amount and kind of contaminants that flow into their systems, it is of obvious advantage to minimize all contaminants. Further, the costs associated with either cleaning catch basins or reconditioning dry wells are substantial. Avoiding or delaying those costs by reducing the amount of contaminants flowing through the system can save substantial amounts of money.

Given the need to effectively filter debris and contaminants from surface water run-off, various catch basin and other filter systems have been devise. As one example, U.S. Pat. No. 5,284,580 describes a collecting frame for use with a drainage sewer. The system utilizes a basin that fits into the sewer drain and is removable therefrom. The basin has a filtering net for trapping debris that flows into the basin through a sewer cover. An imperforate collecting basin catches particulate matter while tiny particles flow through the system with the run-off water. While this device filters out some particulate matter, it does not stop small particles or oils from entering the sewer system.

Another example of a surface water filter system is disclosed in U.S. Pat. No. 5,405,539. The system disclosed in the '539 patent is inserted into an existing storm drain collection box. A frame supports a sheet of filter medium, such as a woven synthetic material that removes particles as small as 42 microns in diameter. Pneumatic rams hold the filter material and frame in place in the collection box. Silt and other particulate debris collects on the filter compartment until the woven filter is clogged and/or the filter compartment is full, at which time excess drainage water overflows, unfiltered, over the back of the filter drain and into the sewer system. The woven filter is replace by removing the spent sheet from the collection box and replacing it with fresh material.

Yet another filter system is disclosed in U.S. Pat. No. 5,372,714. This system is adapted for use with buried, below grade catch basins, and utilizes a filter bag made of a woven plastic fabric that is porous, but which captures solids. The filter bag hangs into the catch basin, supported by the overlying grate. When full, the bag is removed by inserting lifting rods into loops of fabric connected to the bag.

None of the systems described in these patents provides for a simple, easily maintained filter system that screens out solids and selected other contaminants such as oils and other petrochemicals, or other liquid contaminants and chemicals, and there is a need for such a system.

SUMMARY OF THE INVENTION

The surface water run-off filter of the present invention is designed to adapt to existing sewer systems and dry well systems that utilize preexisting sump tanks. The apparatus utilizes a sump tank insert (also referred to as catch basin insert or collection box insert) that is sized to fit into an existing catch basin. Run-off flowing into the system goes through three filters. The first filter is the traditional grate that overlies the inlet to the catch basin. This filter catches large solid particles such as rocks, branches and the like. A removable plate or lid underlies the grate and directs water flow into a secondary filter that is a perforate screen that traps solids that flow past the grate. The water flows through the screen into a collecting vault where even smaller solids that flow through the screen settle out. A third filter comprises a filter media through which all water flows, and which is held in a removable frame. The filter media selected for this tertiary filter depends upon the conditions encountered at a specific location. The media may be specific to absorb oils and petrochemicals, as might be expected in run-off from parking lots. Similarly, oils are often contained in run-off from food processing facilities. Another kind of filter media that can be used is media specifically designed for filtering out carbohydrates. This type of media is used with, for example, catch basins that collect water that has been used as process water in food processing facilities. By filtering out carbohydrates, the facility may be able to reduce the BOD of the water, thereby reducing municipal fees.

The system of the present invention is easily cleaned and maintained, and each component may be separately interchanged when appropriate. For example, the tertiary filter media is held in a frame that is easily removed from the basin insert, and from which the media is easily removed. If upon visual inspection it is evident that the tertiary media needs replacing, the service personnel can replace the media in a matter of minutes. Similarly, the secondary screen can be easily removed from the system and either dumped and cleaned, or replaced if the perforations are clogged. Finally, the entire insert may be removed from the existing catch basin if needed for cleaning or maintenance.

BRIEF DESCRIPTION OF THE DRAWINGS

The invention will be better understood and its numerous objects and advantages will be apparent by reference to the following detailed description of the invention when taken in conjunction with the following drawings.

FIG. 1 is a side sectional view of a prior art catch basin.

FIG. 2 is a side sectional view of a catch basin with the filtration system of the present invention inserted therein.

FIG. 3 is a top plan view of the catch basin shown in FIG. 2, taken along the line 3—3 of FIG. 2.

FIG. 4 is a cross sectional top view of the catch basin shown in FIG. 2, taken along the line 4—4 of FIG. 2.

DETAILED DESCRIPTION OF PREFERRED EMBODIMENTS

A typical prior art storm drain catch basin 1 is shown in cross section in FIG. 1. This kind of a system, which is prone to all of the problems described above, typically includes a sump tank or catch basin 2 that is typically fabricated from pre-cast concrete and which may be essentially any shape, but with is generally either cylindrical or rectangular. Catch basin 2 is formed to have a shoulder 3 extending around the upper inner peripheral edge. A grate 4 rests on shoulder 3. Catch basin 2 is sunk into the ground to a depth such that the upper edge of grate 4 lies at grade level, thus allowing run-off to flow through grate 4 and into catch basin 2. An outflow or outlet pipe 5 is positioned along one side and is connected to an outflow port 6 formed in the catch basin. The entrance to the outflow port on the interior of the catch basin and is shielded by a skimmer 7. Skimmer 7 is closed on all sides except the bottom. This allows surface run-off water to flow from grade through the grate and into the catch basin. The water level in the catch basin rises past the bottom of the skimmer and into the outflow pipe. However, the skimmer prevents floating objects such as sticks and other debris that pass through grate 4 from becoming entrapped in the outflow pipe and clogging the pipe. Water flowing out of the outflow pipe runs into, for example, the sewer system or dry well as the case may be.

The prior art catch basin shown in FIG. 1 rapidly accumulates any debris that flows through the grate. This debris sediments in and collects in the bottom of the basin and can fill the entire basin, clogging the outflow pipe, resulting in run-off water being unable to flow into the sewer system. Further, since the grate filters out only relatively large objects, silt and other suspended sediment, and oils and the like flow directly into the sewer. This is a problem for any sewer system, and in those systems that monitor water that flows into the system, can result in fines or other fees. Silt and sediment flowing into a dry well system is also a substantial problem because it accumulates in the dry well, reducing efficiency of the well and eventually filling it.

A filtration apparatus 10 according to the present invention is shown in cross section in FIG. 2. The apparatus includes a catch basin insert 12 that is shaped to fit into an existing pre cast catch basin 14. Catch basin insert 12 may be essentially any shape corresponding to the shape of the catch basin 14 into which the insert is inserted. As noted, catch basin 12 is designed for installation into existing catch basins. Thus, the apparatus of the present invention can be installed into existing sewer and dry well systems very easily.

As noted above, most catch basins are either round or rectangular, and so in most instances catch basin insert 12 will be of a corresponding shape. Catch basin insert 12 is designed to drop into the pre cast catch basin 14. The insert is readily removable from catch basin 14 for cleaning and other maintenance. Insert 12 has a peripheral shoulder 16 that rests on shoulder 3 of catch basin 14. An outflow pipe 18 is sized to fit into outflow port 20 of the pre cast catch basin when the insert is in position in the pre cast catch basin.

Referring to FIG. 3, there is an imperforate deflector plate 22 that is sized to fit within and rest on shoulder 16 such that it is readily removable therefrom. When positioned as shown in FIG. 3, plate 22 defines a lid covering the inlet opening into the catch basin insert, thereby defining an interior space under the lid and within insert 12. Plate 22 has an opening 24 into which secondary filter basket 26 slidably fits. Plate 22 further has a louvered overflow opening 23 that may best be seen in FIG. 2. Overflow opening 23 comprises a slot 25 in plate 22. Plate 22 includes a louvered lip 27 that overlies slot 25. As detailed more thoroughly below, slot 25 is positioned in plate 22 such that the flow path of water normally flows over lip 27 and into the system. However, if the downstream filters are clogged, slot 25 functions as an overflow vent that allows the flow path to bypass the downstream filters.

Filter basket 26 comprises a cylindrical sleeve having an upper peripheral lip 28 that is larger than the diameter of opening 24. When basket 26 is fitted into opening 24 as shown in FIG. 2, lip 28 rests on plate 22 and suspends basket 26 in place on plate 22. Basket 26 extends into the interior space of insert 12 below plate 22 such that the bottom of basket 22 is spaced apart from the bottom of insert 12. This allows for accumulation of sediment and debris that flows through basket 26. Filter basked 26 is a perforate screen that has plural openings 32 sized to filter out solid debris that flows through a grate 30 that rests on shoulder 16, atop plate 22. Grate 30 is removable and functions as a primary filter for relatively larger solid debris and other objects flowing into the system. As shown in FIG. 2, deflector plate 22 slopes inwardly toward opening 24 to channel run-off water from the grade through grate 30 and into basket 26.

Basket 26 is preferably cylindrical but can be of any shape. The size of the perforate openings in the screen can be varied to accommodate conditions are any give site where apparatus 10 is located. As an example, if the site has a relatively large amount of small solid objects such as small rocks flowing into the system, a filter basket 26 having perforate openings of an appropriate size can be selected and used. To facilitate easy removal of filter basket 26 from its position in plate 22, a handle 34 is provided. Because the filter basket of the preferred embodiment is cylindrical it has substantial surface area to volume ratio and thus has substantial filtering capacity. It can thus be used to filter out a substantial amount of debris before it becomes full or clogged. As particulate matter accumulates within the basket the basket fills from the bottom toward the top. Water is still able to flow freely through the basket until it is completely full.

A skimmer 36 that is open on the bottom side but closed on all other sides covers outflow pipe 18.

A tertiary filter 38 is positioned between outflow pipe 18 and filter basket 26. Tertiary filter 38 comprises a filter media 40 that is sandwiched between and supported by opposed plates of rigid or semi-rigid mesh material 42 with plural openings through which water readily flows. Media 40 is preferably a synthetic fibrous filter medium that includes sorbents selected to filter out contaminants that are desirably removed in any given situation. As such, the particular media that is used a given system will depend upon the kinds of contaminants that are found in that system. For example, in many systems it is desirable to eliminate oils and other petrochemicals from the system. This is true with run-off from parking lots and the like since oil from automobiles is a substantial pollutant and, in dry wells, can cause clogging and other inefficiencies. An example of media 40 selected for its inclusion of sorbents specifically selected to absorb oil and other petrochemicals is sold under the name POLY SOAK™ and is available from Sellars Absorbant Materials, Inc. This filter medium material comprises non-woven melt-blown polypropylene formed into precut pads or rolls. The product includes sorbents designed to absorb oil or other petrochemical based compounds. While filter media selective for petrochemical filtering is the principal type of filter media 40 used with the present invention, other contaminant-specific filter media may be substituted. Filter media 40 thus may be any media selected as a tertiary filter for filtering out selected contaminants that flow through the primary filter, grate 30, and the secondary filter, basket 26.

As noted, and as illustrated in FIG. 4, media 40 is sandwiched between and supported by opposed mesh plates 42, since media 40 typically is not a self-supporting material. Mesh plates 42 are made from an expanded and flattened metal mesh material. The outer lateral edges of the mesh plates are inserted into a pair of opposed channels 44, such as U-shaped channel pieces, that are attached to the interior walls of insert 12 such that the tertiary filter is positioned between basket 26 and skimmer 36. The catch basin shown in the figures is round in cross section. As noted, some catch basins are rectangular. The tertiary filter 38 shown in the figures is shown as a generally planar arrangement. However, the specific embodiment shown is only one example of how the tertiary filter can be built according to the present invention. As one example, the tertiary filter could equally as well be bent into a V-shape to fit into a catch basin insert having a somewhat different configuration. For example, if the catch basin insert was rectangular and the outflow pipe exited the insert in one of the corners, then the tertiary filter could be bent at a right angle to engage channels 44 attached to adjacent walls of the insert. The lowermost edge of tertiary filter 38 rests on the bottom of insert 12 and prevents debris from flowing under the filter.

System 10 is designed so that under normal conditions where none of the three filters is clogged or not functioning properly, all run-off water flowing into the system flows sequentially through each of the three filters. Thus, the flow path in normal conditions is, sequentially, through grate 30, into and through basket 26 and then through filter media 40 before passing out of outflow pipe 18. Each of the filters removes successively smaller particles. Grate 30 stops relatively larger solid objects such as rocks and branches from entering the system. The size of openings 32 in filter basket 26 may be varied to accommodate conditions in a given setting. However, filter basket 26 will in all instances remove relatively smaller solid objects than grate 30. Filter media 40, while being selected according to the filtering specificity required in a particular use condition, filters out either relatively smaller suspended particles than filter basket 26, or liquids such as oils, depending upon the type of media 40. In normal conditions with the filters functioning properly the water flow path is over lip 27. As such, under normal conditions water does not flow through slot 25.

The filter system uses components that are easily removed, cleaned and serviced in the field. For example, grate 30 may be removed to allow filter basket 26 to be cleaned, either by removing the basket and dumping its contents of collected debris, or by other cleaning techniques such as vacuum cleaning. Similarly, basket 26 is easily removed to allow cleaning of sediment and other debris 46 that flowed through openings 32 but was not able to flow through tertiary filter 38 from the interior of catch basin insert 12. Finally, plate 22 is removable from its resting position to allow easy access to tertiary filter 38. When the filter media 40 that is used has absorbed its capacity of oil or other contaminant, is clogged or for some other reason requires replacing, the filter 38 can be removed upwardly through channels 44. Retaining clips (not shown) that maintain opposed mesh plates 42 in position with respect to media 40 are removed and the media is replaced with new media. The mesh plates are then closed over the new media 40 and the retaining clips are closed, thereby sandwiching the new media between the plates. The combination of the plates and new media are then reinserted into channels 44, plate 22 is replaced in position and basket 26 is dropped into opening 24. Grate 30 is replaced in position until the next scheduled maintenance.

Furthermore, if one or both of basket 26 or filter 40 are clogged such that water cannot flow through them, or the volume of water flowing through them is less than the volume of water flowing into the system, water will back up and will flow through overflow slot 25, which is positioned in plate 22 such that water that flows through slot 25 bypasses both basket 26 and filter 40. Overflow slot 25 thus defines a second state water flow path for the situation where one or both of the secondary and tertiary filters is clogged.

While the present invention has been described in terms of a preferred embodiment, it will be appreciated by one of ordinary skill that the spirit and scope of the invention is not limited to those embodiments, but extend to the various modifications and equivalents as defined in the appended claims.

What is claimed is:

1. A surface water run-off filtration apparatus for use with an in-ground, preexisting catch basin connected through a sewer outflow to a sewer system, comprising:

an insert body sized to fit into said pre-existing catch basin, said insert body having an upper peripheral edge defining a shoulder and an outflow pipe positioned for fluid connection with said sewer outflow;

a removable plate on said shoulder to define a catch basin interior beneath said plate, said plate having an opening therethrough;

a removable grate on said shoulder and defining a primary water filter;

a perforate screen extending through said opening through said plate and into said catch basin interior, said perforate screen having plural openings defining a secondary water filter;

a tertiary water filter between said secondary filter and said outflow pipe, said tertiary filter comprising filter media selected for filtering contaminants passing through said primary and said secondary water filters, and further comprising selected synthetic fibrous media sandwiched between opposed perforate plates and positioned such that water flowing into said outflow passes through said tertiary water filter.

2. The apparatus of claim 1 in which the tertiary water filter further comprises synthetic media selected for removal of petrochemicals from water flowing through said tertiary water filter.

3. The apparatus of claim 1 in which said insert body is removable from said preexisting catch basin.

4. The apparatus of claim 1 in which said water filtration apparatus defines a first state water flow path in which run-off water flows sequentially through said primary water filter first, said secondary water filter second, and said tertiary water filter third, and wherein each successive filter of said primary, secondary and tertiary water filters removes successively smaller sized particles from said water.

5. The apparatus of claim 4 in which said tertiary water filter comprises media selective for removal of petrochemicals from said water flowing through said tertiary filter.

6. The apparatus of claim 1 in which said secondary water filter has a lower edge spaced apart from the interior bottom of said insert.

7. The apparatus of claim 4 including an overflow slot in said removable plate having an overlapping lip, wherein a second state water flow path is defined when either the secondary or tertiary water filters are clogged, and wherein in the second state water flow water bypasses said secondary and tertiary filters.

8. In a pre existing in-ground catch basin for collection of run-off water, said catch basin having a below grade water holding vault, an inlet opening into said vault with a removable grate covering said inlet for removing relatively large objects from run-off water, and an outlet through which run-off water flowing into said vault exits into a sewer or dry well, the catch basin defining a water flow path from the ground surface through the grate and into the water holding vault, and through the outlet and into a sewer or dry well, the improvement comprising:

a catch basin insert removably inserted into said below grade vault, said insert having an inlet opening, an outlet opening, and an upper peripheral shoulder for receiving a lid and said grate, said grate defining a first filter covering said inlet opening and said lid defining an insert volume under said lid and within said insert, and said lid having an opening formed therethrough;

a second filter interposed in the flow path between said grate and said outlet opening such that water flowing into said opening in said lid flows through said second filter, said second filter adapted for filtering relatively smaller particulate debris than said grate;

a third filter interposed in the flow path between said second filter and said outlet opening, said third filter adapted for filtering relatively smaller debris than said second filter, said third filter comprising synthetic media supported on a frame and adapted for filtering petrochemicals from said water, wherein said frame comprises opposed mesh plates and said synthetic media is sandwiched between said plates.

9. The apparatus of claim 8 in which said first filter is removable.

10. The apparatus of claim 8 in which said second filter is removable.

11. The apparatus of claim 8 in which said third filter is removable.

12. The apparatus of claim 8 including an overflow bypass slot formed in said lid and positioned such that in a first condition water flow path in which the second and third filters are not clogged water does not enter said overflow bypass slot, and in a second condition water flow path in which either the second or third filters are clogged water flows through said overflow bypass slot.

13. A method of removing contaminants from surface water run-off, comprising the steps of:

(a) inserting into a pre existing sewer catch basin a catch basin insert having an inlet opening having a peripheral shoulder and an outlet opening, a side wall and bottom wall and a grate extending across said inlet opening;

(b) inserting on said catch basin insert on said peripheral shoulder an imperforate plate to define an insert space beneath said plate, and said plate having an opening therethrough;

(c) suspending a filter basket into said insert space through said opening in said plate such that said filter basket extends below said plate and terminates spaced apart from said bottom wall;

(d) interposing between said filter basket and said outlet opening a fibrous synthetic filter; and (e) whereby said steps (a) through (d) define a water flow path in which run-off water flowing into said catch basin insert flows, sequentially, through said grate, through said filter basket, and through said fibrous synthetic filter.

14. The method of claim 13 including the step of selecting the fibrous synthetic filter media of step (d) according to impurities desired to be removed from said water.

15. The method of claim 13 wherein step (d) includes the step of selectively removing petrochemicals from said surface water.

16. A surface water run-off filtration apparatus for use with an in-ground, preexisting catch basin connected through a sewer outflow to a sewer system, comprising:

an insert body sized to fit into said pre-existing catch basin, said insert body having an upper peripheral edge defining a shoulder and an outflow pipe positioned for fluid connection with said sewer outflow;

a removable plate on said shoulder to define a catch basin interior beneath said plate, said plate having an opening therethrough;

a removable grate on said shoulder and defining a primary water filter;

a perforate screen extending through said opening through said plate and into said catch basin interior, said perforate screen having plural openings defining a secondary water filter;

a tertiary water filter between said secondary filter and said outflow pipe, said tertiary filter comprising filter media selected for filtering contaminants passing through said primary and said secondary water filters;

said apparatus defining a first state water flow path in which run-off water flows sequentially through said primary water filter first, said secondary water filter second, and said tertiary water filter third, and wherein each successive filter of said primary, secondary and tertiary water filters removes successively smaller sized particles from said water, and said apparatus including an overflow slot in said removable plate having an overlapping lip, wherein a second state water flow path is defined when either the secondary or tertiary water filters are clogged, and wherein in said second state water flow path water bypasses said secondary and tertiary filters.

* * * * *